United States Patent [19]

Slaughter, Jr.

[11] 3,986,525
[45] Oct. 19, 1976

[54] INTERNAL TANK VALVE

[75] Inventor: Lomis Slaughter, Jr., Houston, Tex.

[73] Assignee: Anderson, Greenwood & Co., Bellaire, Tex.

[22] Filed: Jan. 31, 1975

[21] Appl. No.: 546,108

[52] U.S. Cl............................. 137/630.14; 251/279; 251/144
[51] Int. Cl.²............................................ F16K 1/32
[58] Field of Search.......... 137/630, 630.11, 630.12, 137/630.13, 630.14, 630.15; 251/279, 280, 144

[56] References Cited
UNITED STATES PATENTS

| | | | |
|---|---|---|---|
| 938,491 | 11/1909 | Knauf | 137/630.14 |
| 1,655,729 | 1/1928 | Jones | 137/630.14 |
| 1,870,293 | 8/1932 | Miller | 137/630.15 |
| 3,888,280 | 6/1975 | Tartaglia | 137/630.15 X |

Primary Examiner—Martin P. Schwadron
Assistant Examiner—Robert J. Miller
Attorney, Agent, or Firm—Vinson, Elkins, Searls, Connally & Smith

[57] ABSTRACT

An internal tank valve having a seating plate defining a valve seat, a valve member, a straight line linkage supporting and guiding movement of the valve member to and from engagement with the valve seat, the valve member having a rounded surface facing the direction of flow through the valve seat, a pressure equalizing valve in the valve member, means for moving the valve member into and from engagement with the valve seat and means for absorbing shock loading on the valve member.

11 Claims, 5 Drawing Figures

3,986,525

INTERNAL TANK VALVE

BACKGROUND OF THE INVENTION

In liquid natural gas and other combustible product tanks, many present day safety codes and regulations require the use of an internal tank valve on any inlet or outlet lines to assure control of the combustible products in the event of a leak or rupture in such lines. Such internal tank valves are normally closed valves which are only opened positively and will return to closed when such positive opening force is released. Such internal tank valves are even designed to protect against foundation shifts and earthquakes which may break a bottom withdrawal line.

Many tanks have a sheet metal diaphragm bottom which is capable of reacting to horizontal plane forces but has no capability of reacting to vertical loads exerted upwardly. The vertical loads exerted downwardly are reacted by the prepared foundation. Thus the valve should impose not upward loads on the bottom. Additionally, the valve should be secured to the tank independent of the inlet or outlet pipe.

Internal tank valves have been used which have been of relatively small size and have been a pivoting type of check valve construction.

SUMMARY

The present invention provides an improved internal tank valve which satisfies the requirements of the safety codes and regulations.

An object of the present invention is to provide an improved internal tank valve having a valve member moving vertically in a guided straight-line motion.

Another object is to provide an improved internal tank valve capable of taking substantial loadings without transmitting vertical loads to the bottom of the tank on which it is installed.

A further object is to provide an improved internal tank valve which may be installed in a fuel line to a tank and which diverts the loads of fluids entering the tank.

BRIEF DESCRIPTION OF THE DRAWINGS

These and other objects and advantages of the present invention are hereinafter more fully described and explained with respect to the drawings wherein.

DESCRIPTION OF THE PREFERRED EMBODIMENT

Figure 1:
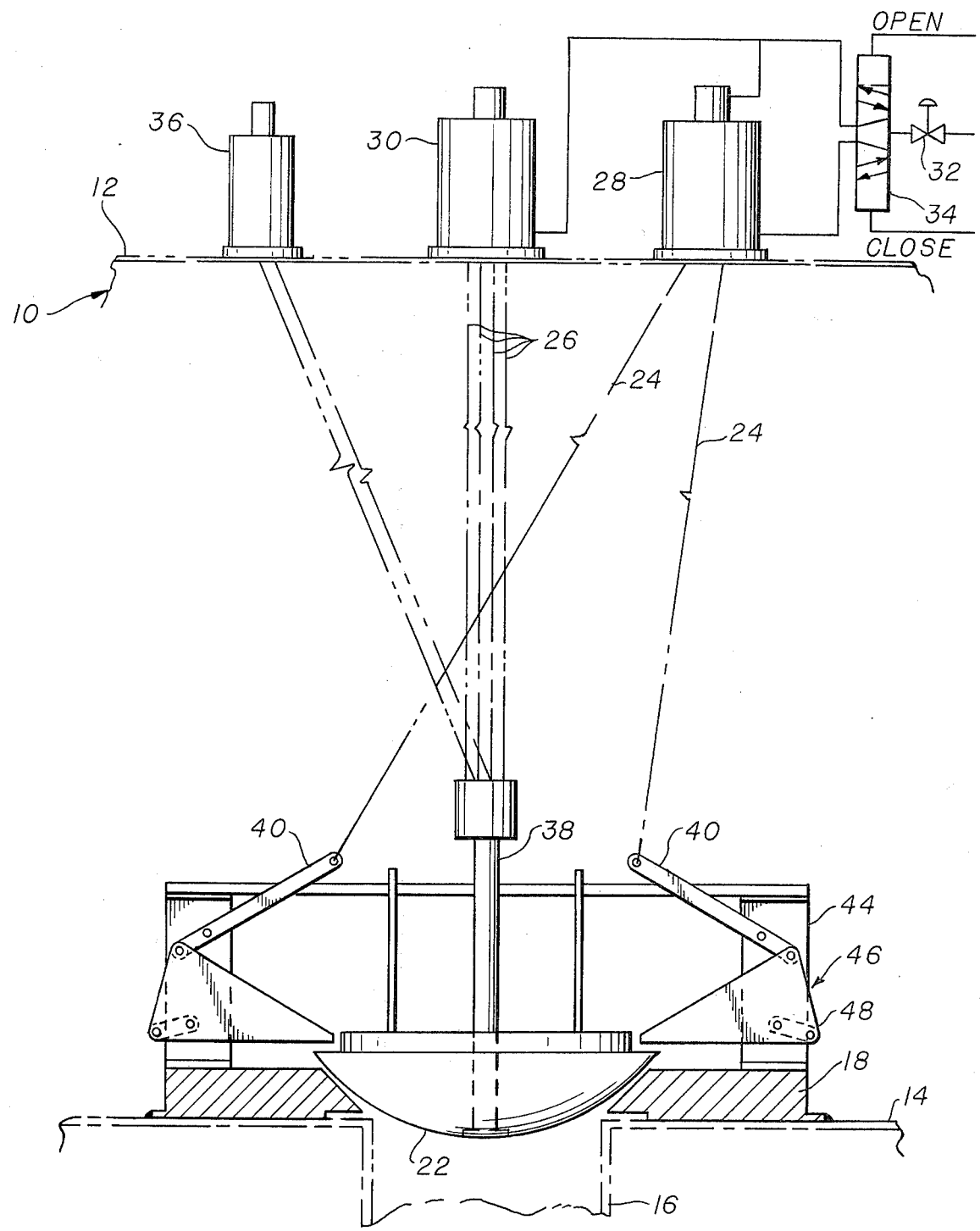
FIG. 1 is a partial vertical sectional view of a tank having the improved internal tank valve of the present invention installed and schematically illustrates the controls for the internal tank valve.

In FIG. 1 the improved internal tank valve of the present invention is illustrated in its installed position in a tank 10. The deck 12, the bottom 14 and the line 16 connecting into the tank 10 through the bottom 14 are shown with other portions of the tank 10 being omitted for clarity. The line 16 may be an inlet or a discharge line connecting into the tank 10. With such lines it is desired that protection be provided against loss of the contents of the tank in the event the line 16 ruptures or separates from tank bottom 14.

The seat ring plate 18 is suitably secured to the bottom 14 as by welding. The seat ring plate 18 defines a conical opening 20 therethrough and is positioned so that such opening is in registry with the opening in bottom 14 for line 16. The ring plate 18 has a very substantial amount of weight for the reasons hereinafter explained. The valve member 22 which has a rounded lower surface is suitably supported and guided for movement to open and close flow through opening 20.

Control of the position of valve member 22 is managed by movement of the close cables 24 and the open cables 26. Close cables 24 are operated by the close actuator 28 and the open cables 26 are operated by the open actuator 30. Each of the actuators 28 and 30 may be a fluid actuated piston in a cylinder with fluid being supplied from a suitable source (not shown) through a pressure regulator 32 and a selector valve 34. Selector valve 34 has a central or venting position, an open position, and a close position and is positioned responsive to fluid pressure delivered to its ends. Valve 34 is connected so that actuation of the system to closed position vents the open actuator 30 and the top of close actuator 28 and supplies actuating fluid to the lower portion of close actuator 28. The manual operator 36 is provided on the deck 12 for manual control of the position of valve member 22. The cables 26 are connected to the valve stem 38 of valve member 22 and the cables 24 are connected to the closing links 40. The valve may alternately be operated by any mechanical or electromechanical operator driving a cable drum, or linear travel device such as a jack screw or a rack and pinion driver with suitable limit controls of force and position.

Figure 2:
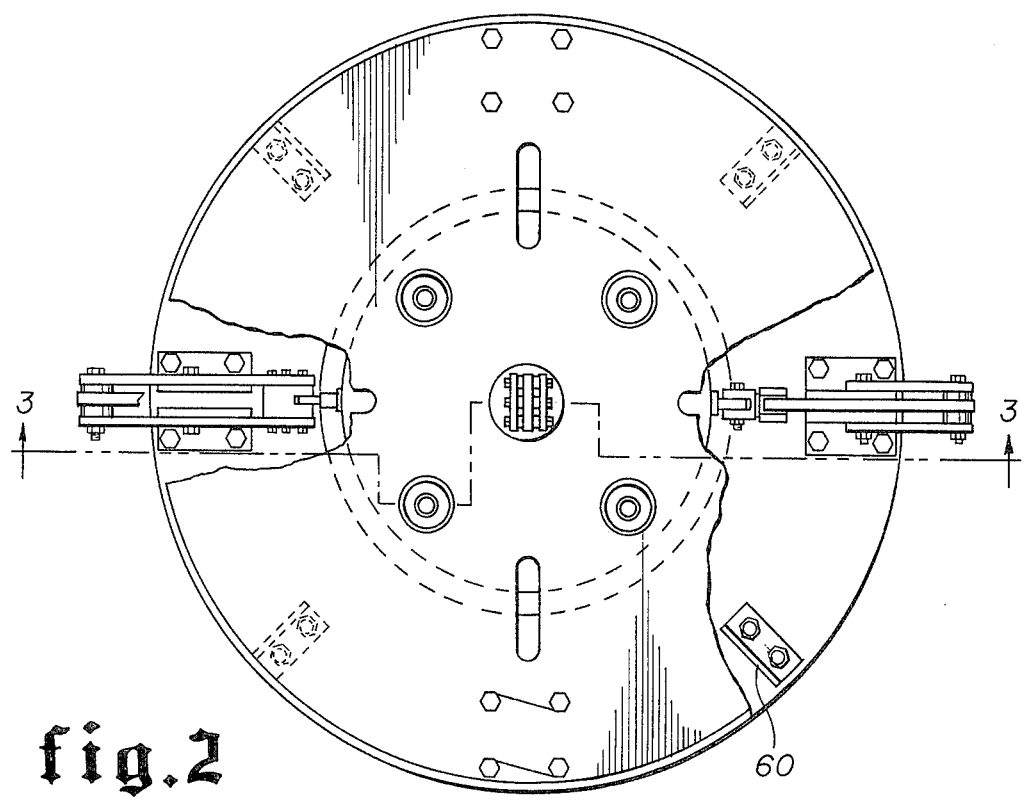
FIG. 2 is a plan view of the improved internal tank valve of the present invention with portions thereof being broken away to more clearly illustrate the guiding support structure for the valve member.
Figure 3:
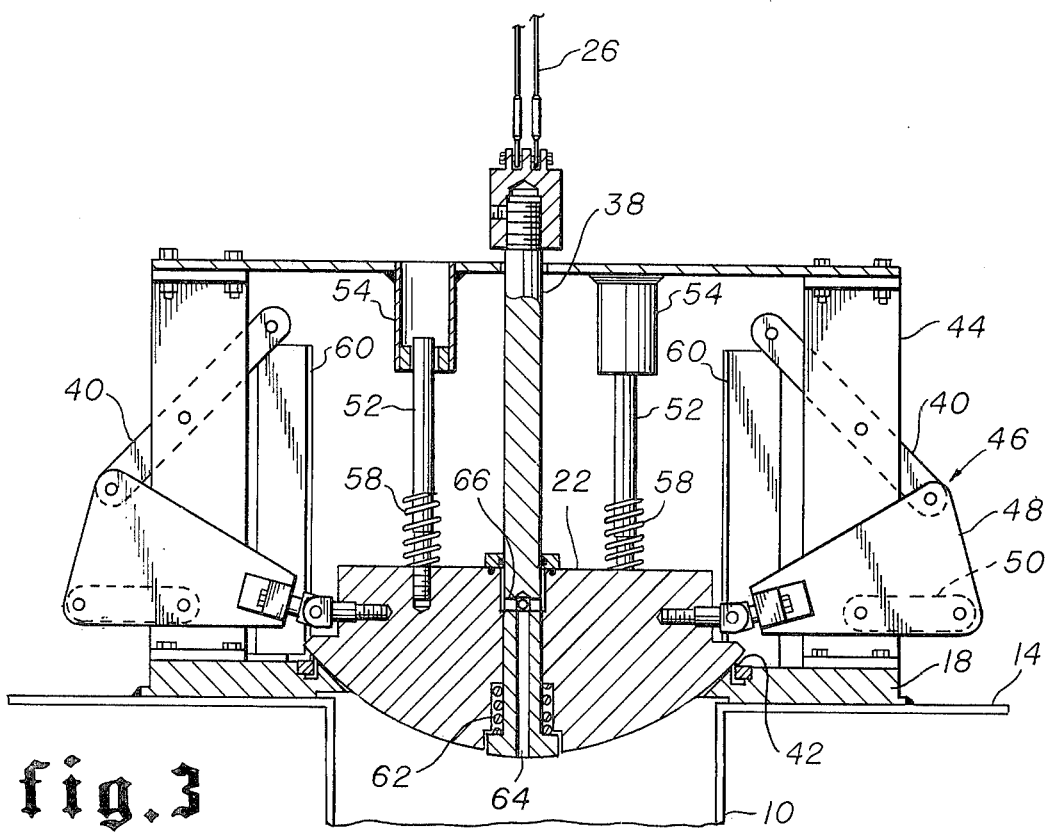
FIG. 3 is a vertical sectional view of the internal tank valve taken along line 3—3 in FIG. 2 and showing the valve member seated.

The support and guiding means for valve member 22 are best shown in FIGS. 2 and 3. As shown the valve member 22 is adapted to seat on the resilient ring 42 when it is in closed position. The valve member support means includes the upstanding legs 44 secured to the seat ring plate 18 outwardly of the valve member 22 and the Roberts or other suitable type of straight-line linkage mechanisms 46. Each of the mechanism 46 includes a plate 48 which is pivotally connected to the valve member 22 as shown, the lower link 50 and the close link 40 with both such links being pivotally mounted to the leg 44 and the plate 48 as shown. The three or more straight-line linkage mechanisms 46 maintain valve member 22 generally parallel to its seated position as it moves to and from such seated position. While only two of the linkage mechanisms 46 are shown in the drawings, it is contemplated that at least three of such mechanisms will be used. As shown in FIG. 2, the bolts for securing two additional linking mechanisms are shown but the mechanisms have been omitted for clarity.

The guiding means includes the guide rods 52 which are secured to and extend upwardly from the top of valve member 22. Each of the rods 52 extends through a guide socket 54. The guide sockets 54 are supported above the valve member 22 by the plate 56 which is secured to the top of the legs 44. As valve member 22 moves vertically, the guide rods 52 slide through the guide sockets 54 to guide the movement and to prevent a strain on the linkage mechanism 46 by a rotation of the valve member 22 about its vertical axis.

A means is provided to absorb the shock of slugs of gas or ice driven, high velocity liquid hitting the valve member 22 while flowing into the tank 10. Such means includes the springs 58 surrounding the guide rods 54. The springs 58 are adapted to engage the lower end of guide sockets 54 when valve member 22 is fully open to thereby absorb some of the shock of such opening so that it is not transmitted directly to the seat ring plate 18 and thus to the bottom 14. The seat ring plate 18, the supporting means and the guiding means are all of substantial strength and weight so that no upward hydraulic or cable forces are imparted to the tank bottom 14 by the internal tank valve structure. Also adding to this weight are a plurality of vortex breakers 60 which are secured to the top of seat ring plate 18 and extend upwardly therefrom.

A pressure relief means is provided across the valve member 22 to equalize pressure differentials thereacross as a necessary condition to opening. Such pressure relief means is formed by the valve stem 38 which extends through the valve member 22. Stem 38 is biased by spring 62 downwardly with respect to valve member 22. The lower end of valve stem 38 has a passageway 64 extending axially thereof and communicates from the space below valve member 22 to the transverse ports 66. The bore through valve member 22 is slightly enlarged from the level of the ports 66 upwardly to form an annular passage around valve stem 38. Valve ring 68 is carried on valve stem 38 and has suitable sealing means to prevent flow between ring 68 and stem 38. A valve seat 70 is positioned in the upper face of valve member 22 immediately surrounding the bore through which stem 38 extends. Valve ring 68 is adapted to engage valve seat 70 when valve stem 38 is held in its lower position by spring 62. Whenever the valve member 22 is to be raised, the cables 26 first raise valve stem 38 to unseat valve ring 68 from engagement with valve seat 70 to thereby provide a pressure relief or equalization flowing through passageway 64, transverse ports 66 and the upper annular passage around valve stem 38.

Figure 4:
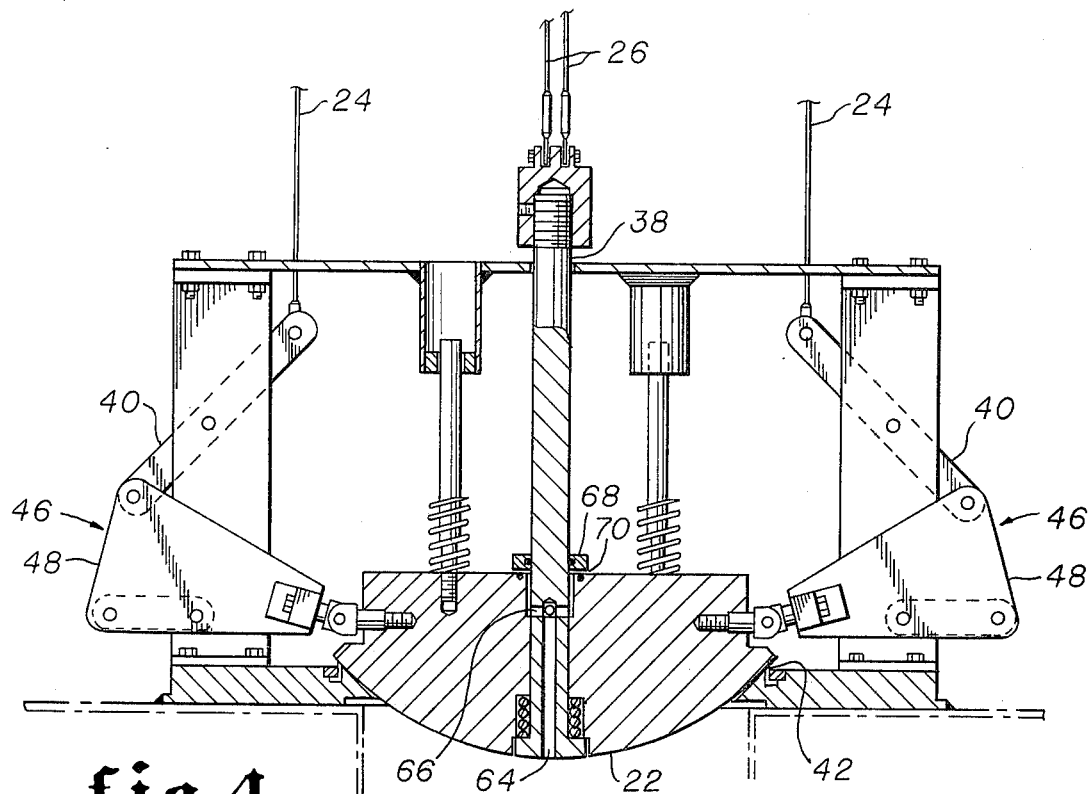
FIG. 4 is a similar sectional view of the internal tank valve showing the relief of pressure across the valve member.
Figure 5:
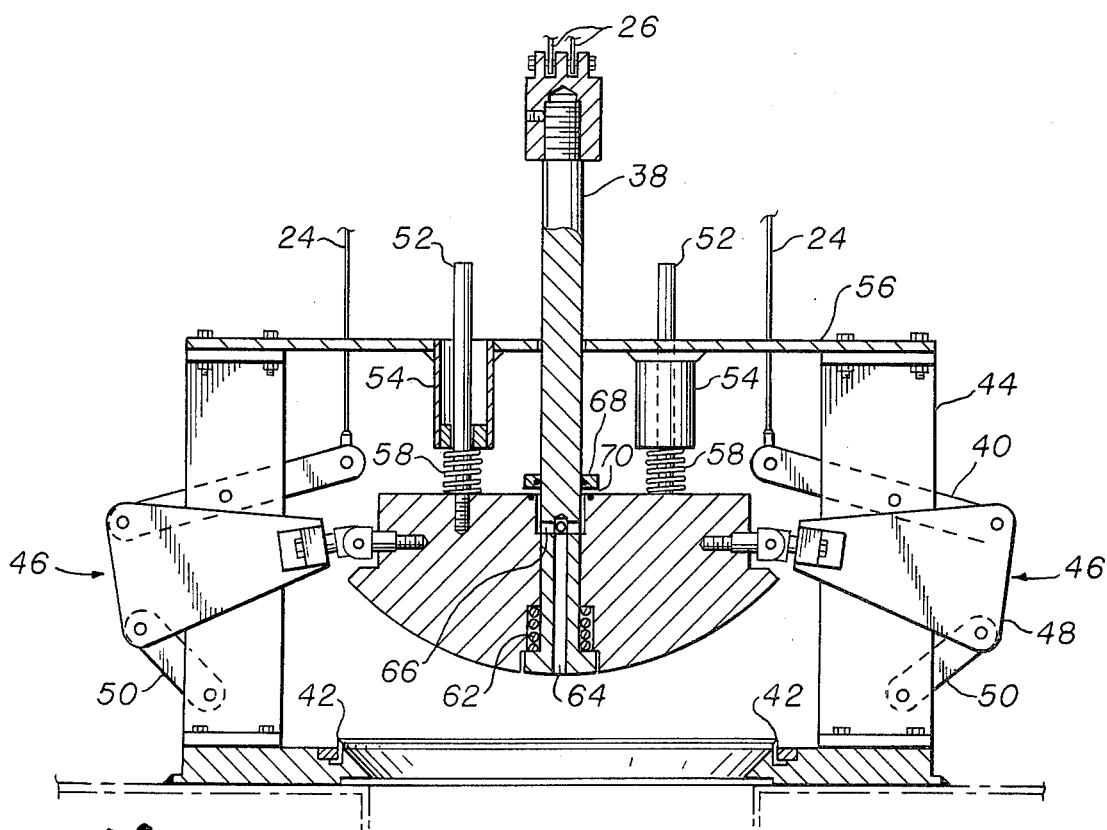
FIG. 5 is another similar sectional view of the internal tank valve showing the valve member in raised or opened position.

The opening of the valve is best understood with reference to FIGS. 4 and 5. In FIG. 4 the valve member 22 is shown still in engagement with the resilient seat ring 42 but open actuator 30 has commenced the pulling of open cables 26. This slight pull has resulted in an initial movement of the valve stem 38 to compress spring 62 and unseat valve ring 68 from valve seat 70. This allows pressure to equalize across valve member 22 to allow it to be raised with a minimum of force. After equalization of pressure open actuator 30 continues to pull in the open cables 26 and valve member 22 moves to its open position shown in FIG. 5. It should be noted that in this position the shock absorbing springs 58 are in engagement with the upper surface of valve member 22 and the lower surface of guide sockets 58 but the springs 58 are not appreciably compressed. This provides additional travel of valve member 22 to absorb shock loadings.

The actuation of open actuator 30 results from supplying actuating fluid to regulator 32 and to the open line on the selector valve 34. This positions selector valve 34 so that actuating fluid is delivered to open actuator 30 and the top of close actuator 28 and the lower part of close actuator 28 is vented. To retain valve member 22 in its open position actuating fluid must be supplied continually to the open line of selector valve 34 and to regulator 32. As soon as the pressure in the open line to selector valve 34 is reduced the valve returns to its central position shown wherein both the close and open actuators are vented and the valve member 22 returns to closed position.

Valve member 22 may be closed by supplying actuating fluid to pressure regulator 32 and to the close line leading to selector valve 34. This allows the valve 34 to be positioned to deliver actuating fluid from regulator 32 to close actuator 28 and at the same time vents open actuator 30 to assure that it does not resist closing. Actuation of close actuator 28 pulls the close cables 24 upwardly. The upward movement of cables 24 raises the inner ends of close links 40 to cause the plate 48 of the mechanism 46 to be forced downwardly whereby valve member 22 is positively moved into seated position on the seat ring 42.

With the valve member 22 in engagement with seat ring 42 any break in or separation of line 16 from tank 10 does not result in the spilling of fluids contained in tank 10. Unless valve member 22 is being positively held in its open position by open actuator 30, it returns to seated position by having sufficient weight to seat once actuator 30 is vented through valve 34. With this system of controls the improved internal tank valve of the present invention will always be closed unless positively opened by actuator 30 or manual operator 36.

From the foregoing, it can be seen that the present invention provides an improved internal tank valve which functions to close an opening into a tank without putting undue strain on the tank bottom even due to shock loads, and which has a valve member with a rounded under surface to direct flow outwardly into the tank and which valve member moves in a controlled, guided path to control its position relative to its seat ring at all times and assure that it does not tilt.

What is claimed is:

1. An internal tank valve for use in a tank to prevent flow through the opening in the tank into which a line connects, comprising
    a seat ring plate secured to the bottom of the tank and defining a valve seat in surrounding relationship to the opening into the tank to which the line connects,
    a valve member movably positioned within said tank and adapted to engage said valve seat to shut off flow into said tank,
    the weight of said valve member on said valve seat together with the head of liquid in the tank above said valve member resisting unseating of said valve member from said seat,
    means connecting between said seat ring plate and said valve member for supporting and guiding said valve member with respect to said valve seat to assure straight line, vertical movement of said valve member upward out of engagement with said valve seat and downward into engagement with said valve seat without transmitting the forces on said valve member resulting from flow into the tank through the line to the bottom of the tank, and
    means on the exterior of said tank connecting to said valve member for opening said valve member.

2. An internal tank valve according to claim 1, wherein said supporting and guiding means includes a straight line linkage mechanism supported from said seat ring and connected to said valve member.

3. An internal tank valve according to claim 2, including
   a plurality of guide rods secured to the top of said valve member and extending upwardly therefrom, and
   a plurality of guide sockets secured to said valve member supporting means in a position above said valve member and with each socket in position to receive one of said guide rods in sliding relation thereto.

4. An internal tank valve according to claim 2 wherein said straight line linkage mechanism is a Roberts straight line linkage mechanism.

5. An internal tank valve according to claim 1, including
   means establishing a communication between opposite sides of said valve member, and
   a relief valve positioned in said communication to control flow therethrough,
   said relief valve being actuated by said valve member opening means whereby upon initial actuation of said opening means said relief valve is opened to allow equalization of pressures between opposite sides of said valve member.

6. An internal tank valve according to claim 1, including
   means on the exterior of said tank connecting to said valve member for closing said valve member.

7. An internal tank valve according to claim 6, wherein said valve member opening and closing means includes
   an open actuator mounted on the deck of the tank,
   means connecting said open actuator to said valve member whereby upon actuation of said open actuator said valve member is moved out of engagement with said valve seat to open position,
   a close actuator mounted on the deck of the tank,
   means connecting said close actuator to said valve member whereby upon actuation of said close actuator said valve member is moved into engagement with said valve seat, and
   means for controlling said actuators.

8. An internal tank valve according to claim 1, wherein
   the lower side of said valve member has a generally spherical shape to distribute the fluids flowing thereagainst outwardly in the tank.

9. An internal tank valve according to claim 1, including
   resilient means positioned between said supporting means and said valve member to absorb the shock of impact loads resulting from slugs of gas or ice flowing into the tank and striking said valve member whereby the forces of said impacts are substantially insulated from the tank bottom.

10. An internal tank valve according to claim 3, including
    a spring surrounding each of said guide rods,
    each of said springs having a free length to be engaged without substantial compression by said valve member and the one of said guide sockets into which its guide rod projects when said valve member is in its open position.

11. An internal tank valve for use in a tank to control flow through a line connecting into the tank, comprising
    a seat ring secured to the bottom of the tank, in communication with the line connecting into the tank and defining a valve seat around said communication,
    a valve member movably positioned within said tank and adapted to engage said valve seat to shut off flow into said tank,
    a support structure having a plurality of legs and a plate with each of the legs being secured to said plate and to said seat ring,
    a plurality of linkages connected to said valve member and supported by said support structure to position said valve member for coaction with said valve seat to open and close flow therethrough,
    means coacting between said valve member and said support structure to guide the vertical movement of said valve member to and from said valve seat,
    means on the exterior of the tank connecting to said valve member for raising said valve member out of engagement with said valve seat,
    said valve member having a passage extending therethrough,
    a normally closed relief valve mounted on said valve member,
    said relief valve controlling flow through said passage,
    said valve member raising means being connected to open said relief valve whereby pressure is equalized across said valve member prior to raising said valve member off said valve seat, and
    resilient means positioned between said valve member and said support structure to protect against transmission of the entire force of shock loadings resulting from slugs of gas or ice flowing through said valve seat to said seat ring,
    said valve member being shaped to minimize the upward forces thereon by the liquids flowing through the valve seat.

* * * * *